United States Patent
Majumdar (10) Patent No.: US 7,107,515 B2
(45) Date of Patent: Sep. 12, 2006

(54) RADIATION HARD DIVIDER VIA SINGLE BIT CORRECTION

(75) Inventor: Rahul S. Majumdar, Redondo Beach, CA (US)

(73) Assignee: The Boeing Company, Seattle, WA (US)

( * ) Notice: Subject to any disclaimer, the term of this patent is extended or adjusted under 35 U.S.C. 154(b) by 671 days.

(21) Appl. No.: 09/952,621

(22) Filed: Sep. 14, 2001

(65) Prior Publication Data

US 2003/0056170 A1    Mar. 20, 2003

(51) Int. Cl.
*G06F 11/08* (2006.01)
(52) U.S. Cl. ........................ 714/797; 714/746
(58) Field of Classification Search ............... 714/797, 714/746, 724, 820, 819, 799, 704
See application file for complete search history.

(56) References Cited

U.S. PATENT DOCUMENTS

| | | | | |
|---|---|---|---|---|
| 5,993,055 A | * | 11/1999 | Williams | 714/732 |
| 6,393,594 B1 | * | 5/2002 | Anderson et al. | 714/738 |
| 6,662,133 B1 | * | 12/2003 | Engel et al. | 702/117 |

* cited by examiner

*Primary Examiner*—Phung My Chung
(74) *Attorney, Agent, or Firm*—Gates & Cooper LLP (57) ABSTRACT

A radiation hard logic device such as a divider is disclosed. The logic device includes a voter module to determine an error free logic device output, a feedback module to generate a correction signal and provide the signal to a logic correction module to correct the erroneous device output at substantially the same time that the erroneous logic device is presented to the logic correction module.

18 Claims, 10 Drawing Sheets

RADIATION HARD DIVIDER VIA SINGLE BIT CORRECTION

BACKGROUND OF THE INVENTION

1. Field of the Invention

The present invention relates to error-resistant digital logic devices, and in particular to a system and method for correcting errors in a logic device.

2. Description of the Related Art

Computer memory and other semiconductor components are susceptible to environmental effects that can cause them to fail. One class of failures occurs as a result of exposure to radiation, which is common in the space environment. Such radiation can be devastating to a satellite lacking adequate safeguards. When cosmic radiation passes through a sensitive semiconductor component in a satellite, one of three possible conditions may result.

In a microprocessor or RAM chip, a single-event upset (SEU) can occur wherein the contents of a particular logical device such as a register or a divider become inverted (e.g. a bit flips from 0 to 1). As a result, sensor data can be corrupted, algorithms can fail, and the satellite firmware can be adversely affected. A corrupted program could attempt to execute random code or data in the memory may be lost.

Furthermore, different semiconductor devices have different susceptibilities to radiation induced failures. Some device designs may reduce (or virtually eliminate) the risk of a radiation induced failure, however, it is often not reasonable to apply such techniques to every semiconductor device. What is needed is a system and method for recovering from SEUs. The present invention satisfies that need.

SUMMARY OF THE INVENTION

To address the requirements described above, the present invention discloses an error correcting logic device. In one embodiment, the device comprises a plurality of logic modules communicatively coupled in parallel, each logic module including a logic module output; a voter module, communicatively coupled to the logic module outputs, the voter module configured to determine an error free logic device output; and a feedback module, communicatively coupled to each of the logic module outputs and the voter module, the feedback module configured to determine which of the logic module outputs are in error and to provide a correct command to the logic module determined to be in error to correct the logic module error at a delayed clock cycle. In another embodiment, the invention comprises method steps of determining an error free logic device output value, and providing a correct command derived from the error free logic device output value to a logic correction module communicatively coupled to the logic device output. In one embodiment, the logic correction module inverts the input according to a command signal that is provided to the logic correction module at substantially the same time as the uncorrected error is provided to the logic correction module.

The logical device can be implemented as a divider and used in a clock and data recovery unit. The divider uses a "triplicate and vote" technique to mitigate against SEUs. The design includes divider circuitry with a logic correction module to correct SEU errors, and a feedback module that detects which dividers are upset, and corrects that particular divider on a bit by bit basis until all of the dividers have reacquired phase and frequency coherency. This results in a clock signal that does not move in discrete steps of 45 degrees or more in phase due to radiation caused upsets.

The present invention permits the use of faster clock speeds, designs require that the clock period be long enough to allow data to propagate from the dividers, through the voting module, and back to the divider before the next clock edge occurs. Hence, data must be sent through the voter and fed back to the inputs of all the dividers within a single clock cycle. This limits the maximum clock frequency of the divider network. The present invention takes the voter out of the feedback loop. Instead, data is evaluated in parallel with the voting scheme, and corrupted bits are corrected at a later clock cycle. Because the data thus has fewer gates to propagate through, a faster clock signal can be used. The correction technique also corrects corrupted bits internal to the divider so that phase and frequency coherency between all dividers is re-established before the next SEU event.

The present invention does not require a "hard" voter module (one that is impervious to SEU events) to perform divider correction and maintain phase-frequency coherency. At higher clock frequencies, the wire-OR scheme of such "hard" voters introduce significant signal ringing and potentially fatal oscillation problems. Further, even "hard" voters can be susceptible to SEUs, and if the voter were somehow upset, corrupt data would be fed back to the dividers, possibly causing a functional failure. The present invention uses a "soft" voter that circumvents the ringing problem typically associated with hard voter designs. This is accomplished by identifying when the voter has been upset and deactivating certain signal paths to ensure that phase and frequency coherency are maintained.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
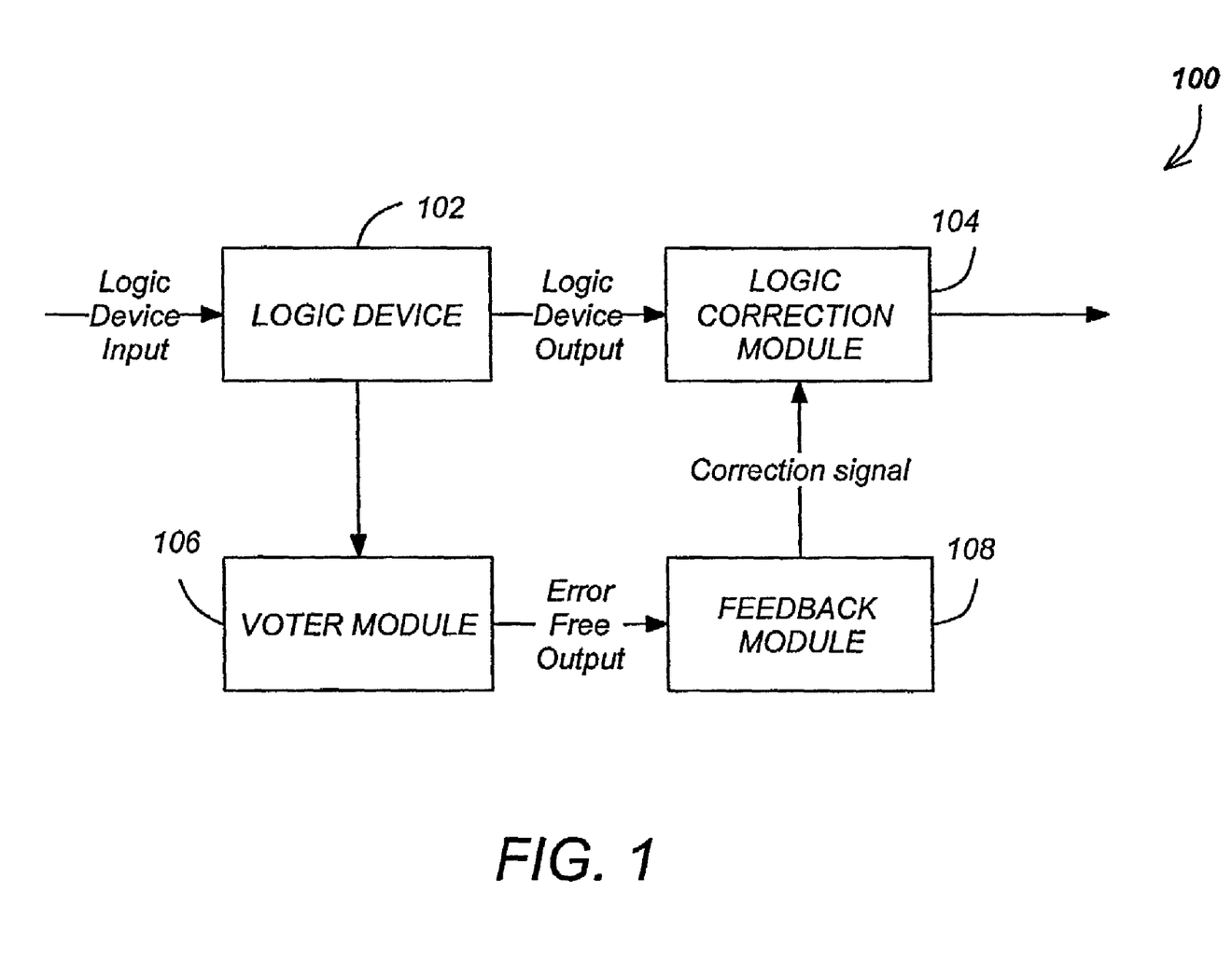
FIG. 1 is a block diagram showing one embodiment of the present invention.

FIG. 1 is a diagram showing one embodiment of the present invention. A logic device 102 accepts a logic device input, and provides a logic device output. A logic correction module 104 accepts the logic device output, and in accordance with a correction signal from a feedback module 108, corrects the logic device 102 output to provide an error-free output. The feedback module generates the correction signal from an error free output signal from an error detection device such as a voter module 106. The logic device 102 could comprise any combination of discrete logic devices such as logic gates, flip-flops and inverters.

Figure 2:
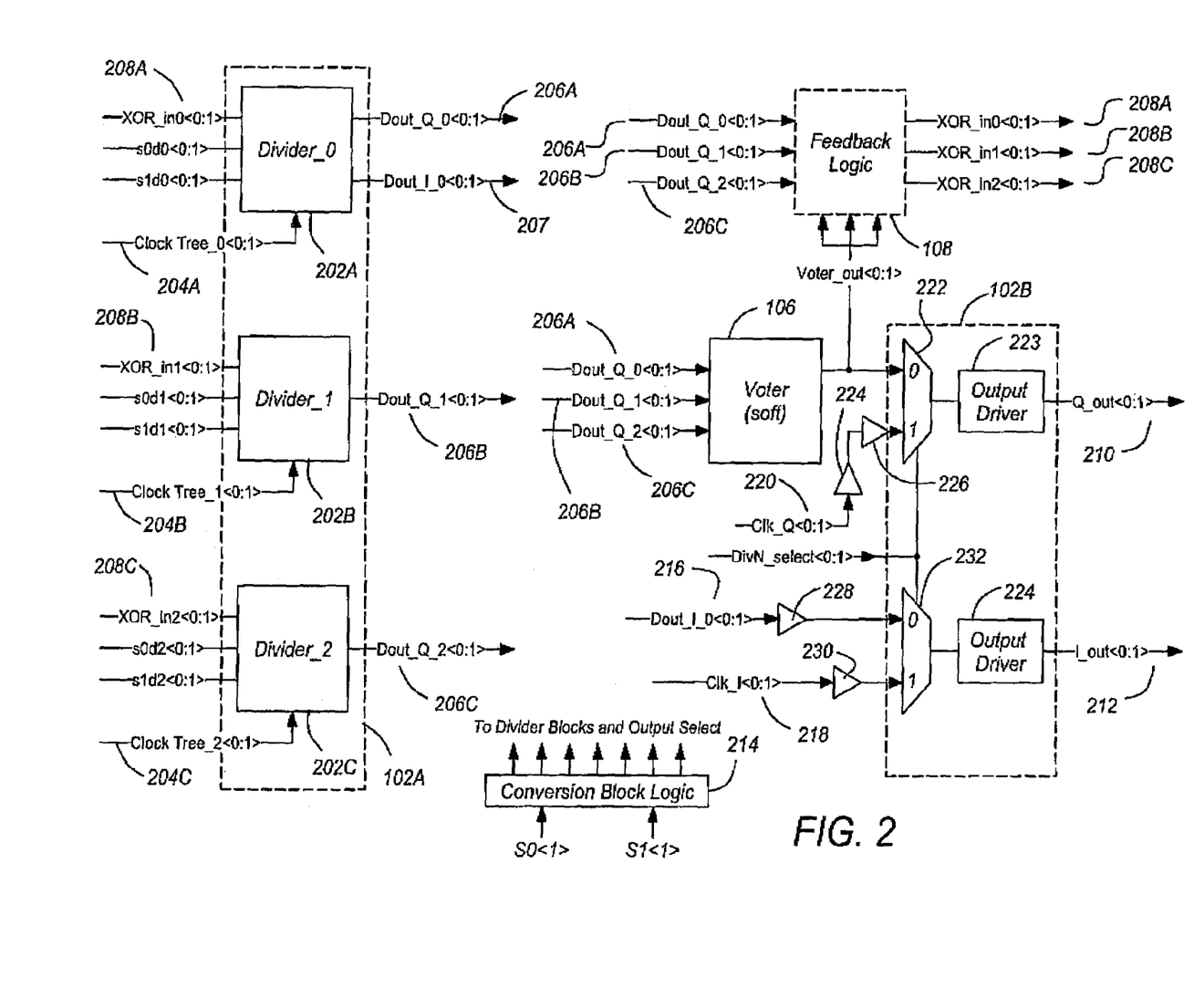
FIG. 2 is a block diagram showing additional details regarding one embodiment of the present invention.

FIG. 2 is a diagram showing additional details regarding one embodiment of the present invention. In the illustrated embodiment, the logic device 102 includes plurality of dividers 202A–202B connected in parallel. Each of the dividers includes an exclusive OR input 208A–208C a clock inputs 204A–204C, and select inputs s0d0<0:1>, s1d0<0:1>, s0d1<0:1>, s1d1<0:1>, s0d2<0:1>, and s1d2<0:1>. The select inputs are controlled by conversion block logic 214, which accepts divider commands S0<1> and S1<1> which select the division ratio N of dividers 202A–202B (e.g. 2:1, 4:1, etc.) and output selection.

The dividers 202A–202C provide divider outputs 206A–206C that are communicatively coupled to a voter module 106. The voter module 106 sends a majority logic level output to the output drivers 223 and 224. The voter module 106 is communicatively coupled to a feedback module 108. If a SEU bit causes any of the dividers 202A–202C to change in phase/frequency, the feedback logic module 108 determines which of the outputs 206A–206C of the plurality of dividers 202A–202C is in error (e.g. off in phase) and re-align the data stream to be in phase alignment with the two dividers having error free outputs. Multiplexer 222 accepts the voter module 106 output and a Clk_Q$_{13}$ <0:1> signal to an output driver 223, depending on the value of the DivN_select<0:1> signal. The Clk_Q_<10:1> signal, conditioned and delayed by buffers 224 and 226, is the appropriate output of the multiplexer 222 when the divider is in a 1:1 mode, while the voter module 106 output is the appropriate output in the 2:1 or 4:1 mode. Similarly, multiplexer 232 determines whether the Dout_I_0<0:1> signal or the Clk_I<0:1> signal is provided to output driver 224 to supply the I_out<0:1> signal.

Figure 3A:
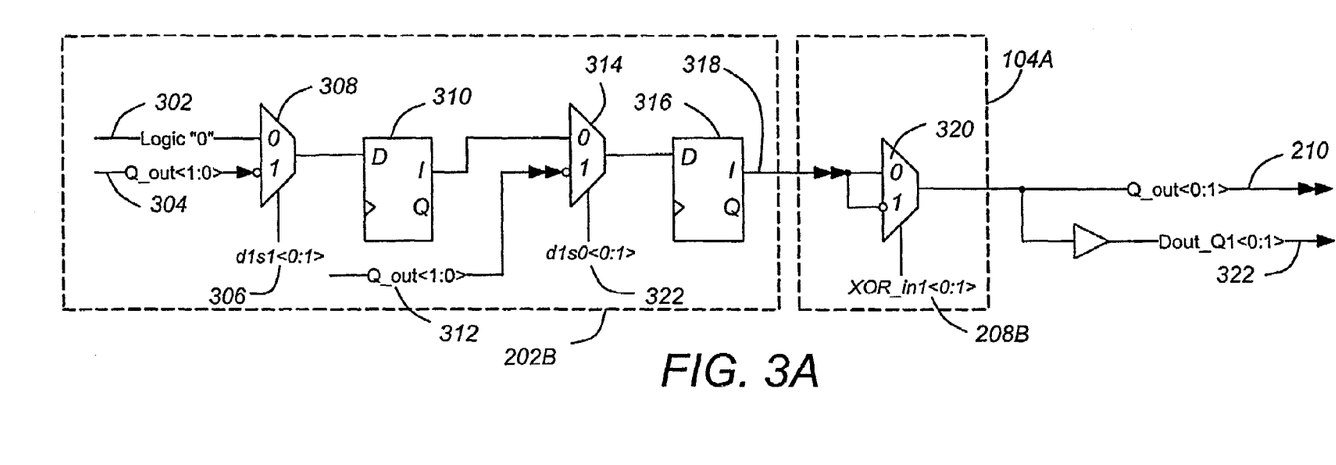
FIGS. 3A and 3B are diagrams depicting an exemplary divider.
Figure 3B:
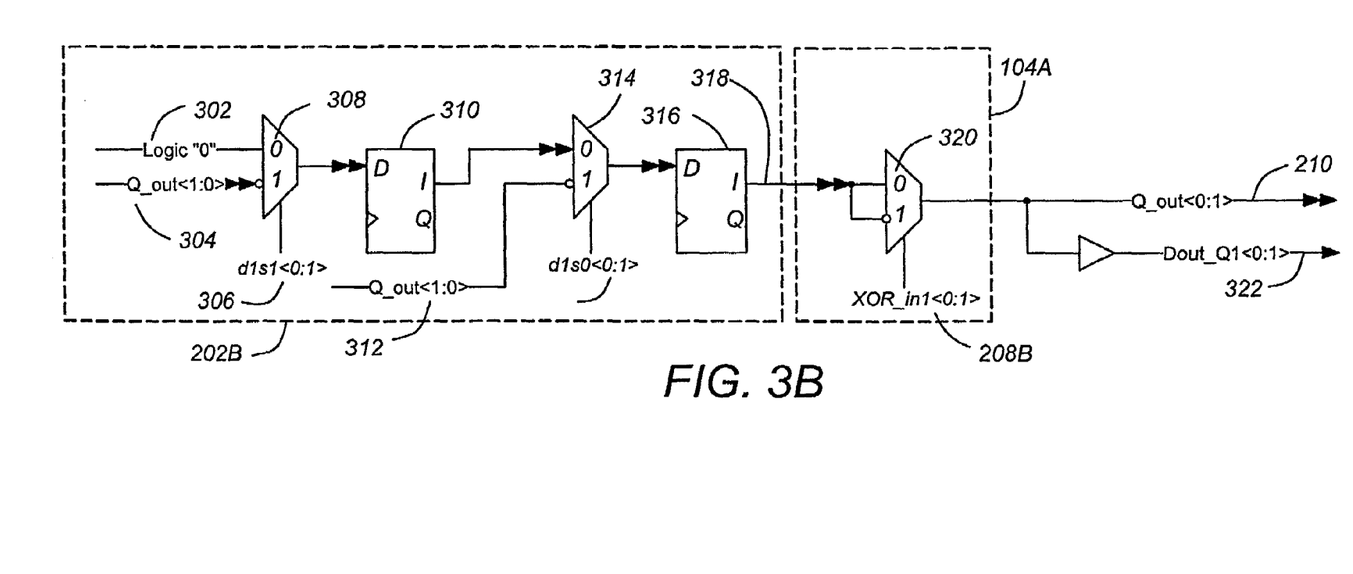

FIGS. 3A and 3B are diagrams depicting further details regarding a representative divider 202B from among the dividers 202A–202C depicted in FIG. 2. FIGS. 3A and 3B also depict one embodiment of the logic correction module 104, in which each of the dividers 202A–202C includes a communicatively coupled logic correction module 104A–104C.

The divider 202B depicted in FIGS. 3A and 3B can operate in a 2:1 mode or a 4:1 mode (N=2 or N=4), depending on the logical value of select signals 306 (d1s1<0:1>) and 322 (d1s0<0:1>). FIG. 3A depicts the divider 202B operating in the 2:1 mode (the signal path is indicated by the double arrow in FIG. 3A). In the 2:1 mode, the input to the delay flip flop 310 is set to a logical zero by the selection of select signal 306 (d1s1<0:1>). The output of the delay flip-flop 310 is provided to a second multiplexer 314. The second multiplexer is also provided the previous output signal 312 (Q_out<1:0>) at an inverted input. In the 2:1 mode, the input to the second delay flip flop 316 is set to the inverted previous output Q_out<1:0> by appropriate selection of the second select signal 322 (d1s0<0:1>). The output of the second delay flip-flop 316 is provided to a third multiplexer at an uninverted input and an inverted input. The third multiplexer 320 presents either the inverted or non-inverted input at the multiplexer output according to the correction signal 208B. Thus, the multiplexer 320 serves as the correction mechanism for any corrupted bits in the system. Since any one bit must either be a '1' or '0' a corrupt bit must be in its opposite state. Therefore the feedback circuitry activates the multiplexer 320 via signal XOR_in__1 to flip any and all bits necessary to regain phase coherency with the other two working dividers 202A and 202C.

FIG. 3B depicts the divider operating in the 4:1 mode. Operation in the 4:1 mode is similar to that of operation in the 2:1 mode, except that the signal path follows the double arrows shown in FIG. 3B, by appropriate selection of select signals 306 (d1s1<0:1>) and 322 (d1s0<0:1>).

Figure 4A:
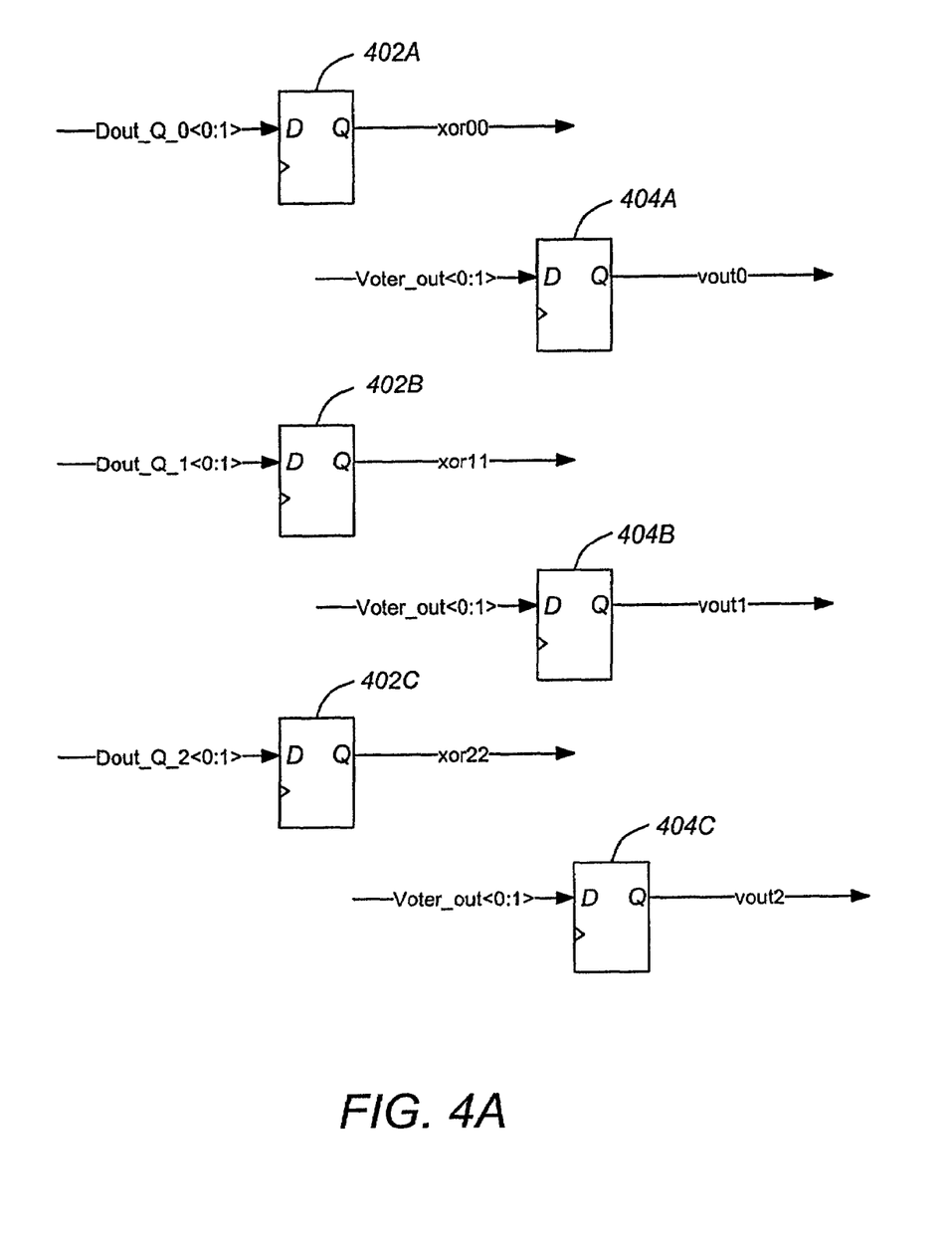
FIGS. 4A and 4B are diagrams showing one embodiment of the feedback module.

FIGS. 4A and 4B are diagrams showing one embodiment of the feedback module 108 of the present invention. As shown in FIG. 4A, the feedback module 108 accepts as inputs, the outputs 206A–206C of each of the three divider modules 202A–202C that make up the logic device 102, as well as the voter output Voter_out<0:1>. The input data from each of the divider modules 202A–202C is latched by delay flip flops 402A–402C, and the voter module output is latched by delay flip-flops 404A–404C.

Figure 4B:
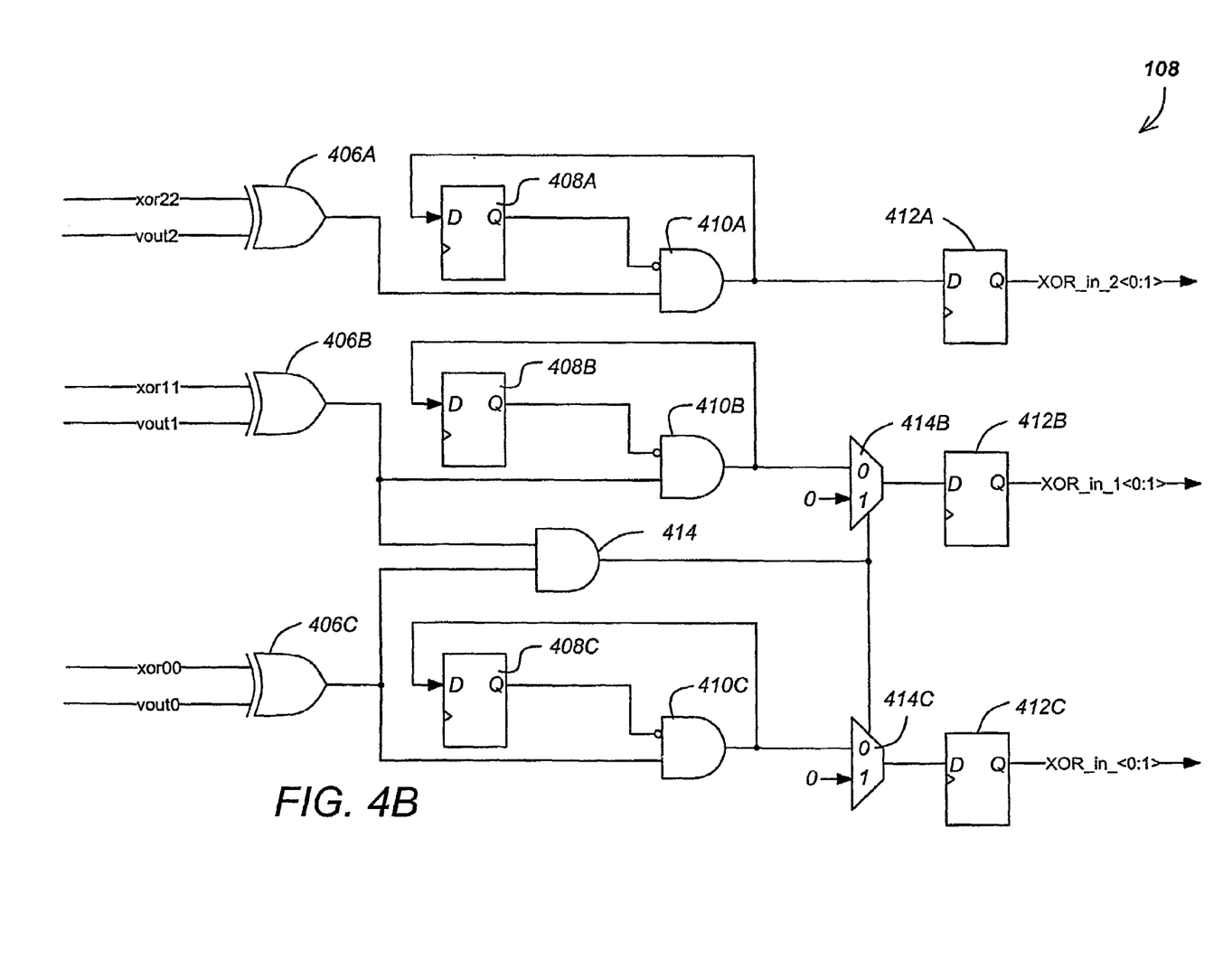

FIG. 4B is a diagram further illustrating the feedback module 108. The latched flip flop outputs and voter module 106 output 404A–404C, are provided to XOR gates 404A–404B. The output of each XOR gate 404A–404C can be logically true only if the voter data is logically different than the divider block data. In this manner it is determined which of the three dividers is off in phase/frequency due to a SEU hit. This generated logic 'one' from the outputs of the XOR gates 406A–406C is then propagated through the remaining logic and latched into the output delay flip-flops 412A–412C.

The combination of AND gate 414 delay flip flops 408A–408C, and gates 410A–410C and multiplexers 414B and 414C act as a toggle. Therefore logic 'one' signals from the outputs of the XOR gates 406A–406C are only latched into the output delay flip flops 412A–412C on alternating clock cycles. The correction pulse is latched out of the output delay flip flops 412A–412C at the precise time the corrupted bit is clocked out of the delay flip flops 316 in the divider module 202B—regardless of whether the divider is in the 2:1 mode illustrated in FIG. 3A or the 4:1 mode illustrated in FIG. 3B. The correction pulse causes the logic correction module 104, in the form of multiplexer 320 to select input 'one', i.e. the inverted bit. Thus, a corrupted divider output can be corrected on a bit by bit basis.

Figure 5:
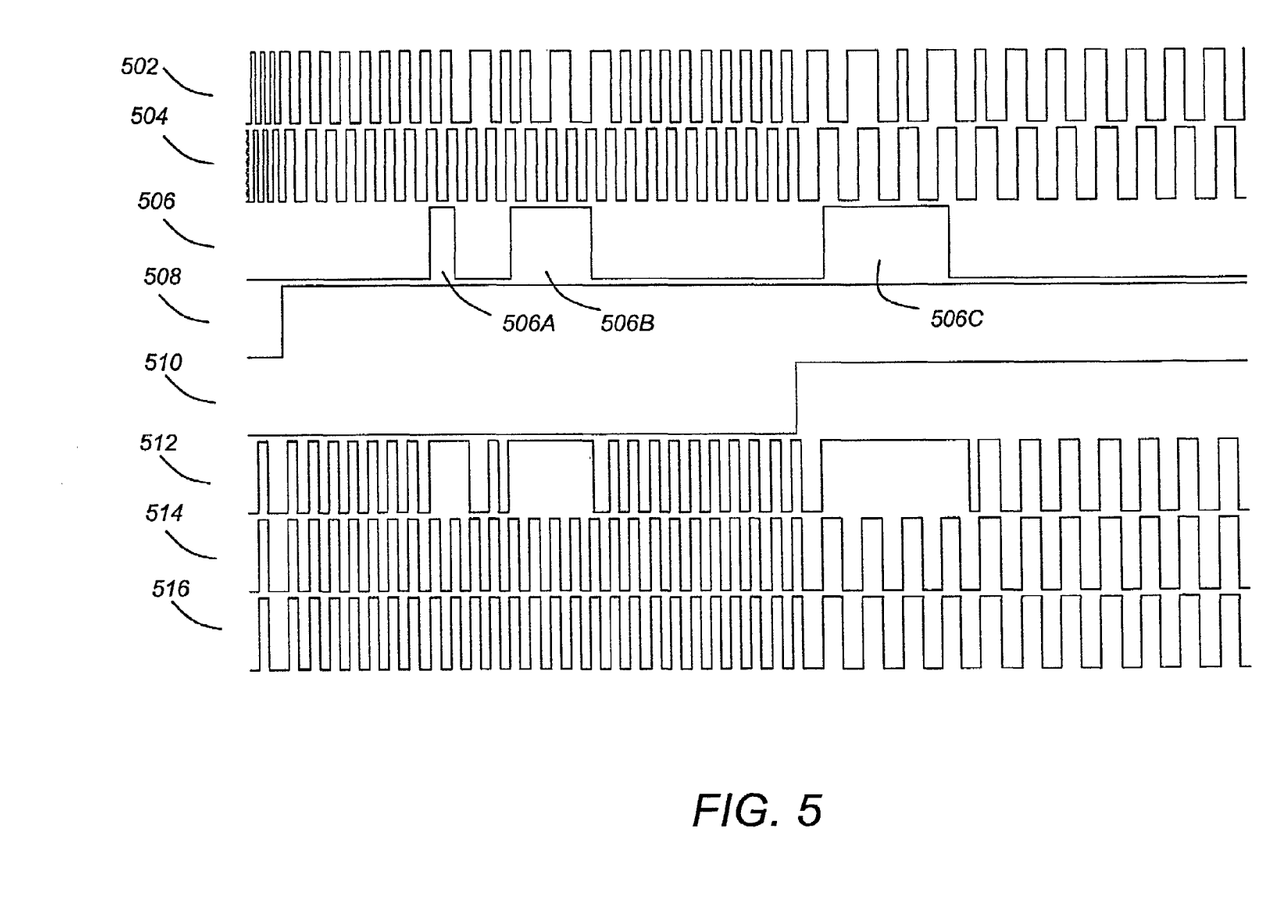
FIG. 5 is a logic timing diagram showing the operation of one embodiment of the present invention.

FIG. 5 is a logic timing diagram depicting the operation of one embodiment of the present invention. Plot 506 shows a plot showing the occurrence of single-event upset (SEU) at times 506A, 506B and 506C in divider 202A. This SEU manifests itself as an erroneous divider 202A output, as shown in plot 512. During the SEU hit, the output of divider 202B (divider_1) and the output of divider 202C (divider_2) maintain frequency and phase coherency, but divider 202A does not maintain coherency and thus needs to be 'realigned' with the two working dividers 202B and 202C. Via the feedback module 108, the output signal divider_0 from divider 202A is corrected into realignment with the output of dividers 202B and 202C after the effects of the SEU hit have sufficiently dissipated (i.e. gone to logic '0' in plot 506). Signal lines S0 (plot 508) and S1 (plot 510) in FIG. 5 only serve to select the divide by N ratio outputs (I_out/Q_out) for the divider.

The output of the divider 202 is determined from a majority bit value of dividers 202A–202C, and therefore remains error free, even during SEU hits 506A-506C. The I-channel output (I_out, as shown in plot 502) is corrupted, even at times when the Q-channel output (Q_out, as shown in plot 504) is error-free. This is due to the fact that in the design described above, the Q-channel output is the result of a majority vote of the dividers, while the I-channel output is not. The Q-channel output is therefore much less susceptible to SEU hits than the I-channel. Since the I-channel is tapped directly from divider_0, any SEU hits in divider_0 will also corrupt the I-channel; once divider_0 is realigned with divider_1 and divider_2, the I-channel re-enters quadrature phase with the Q-channel.

Figure 6:
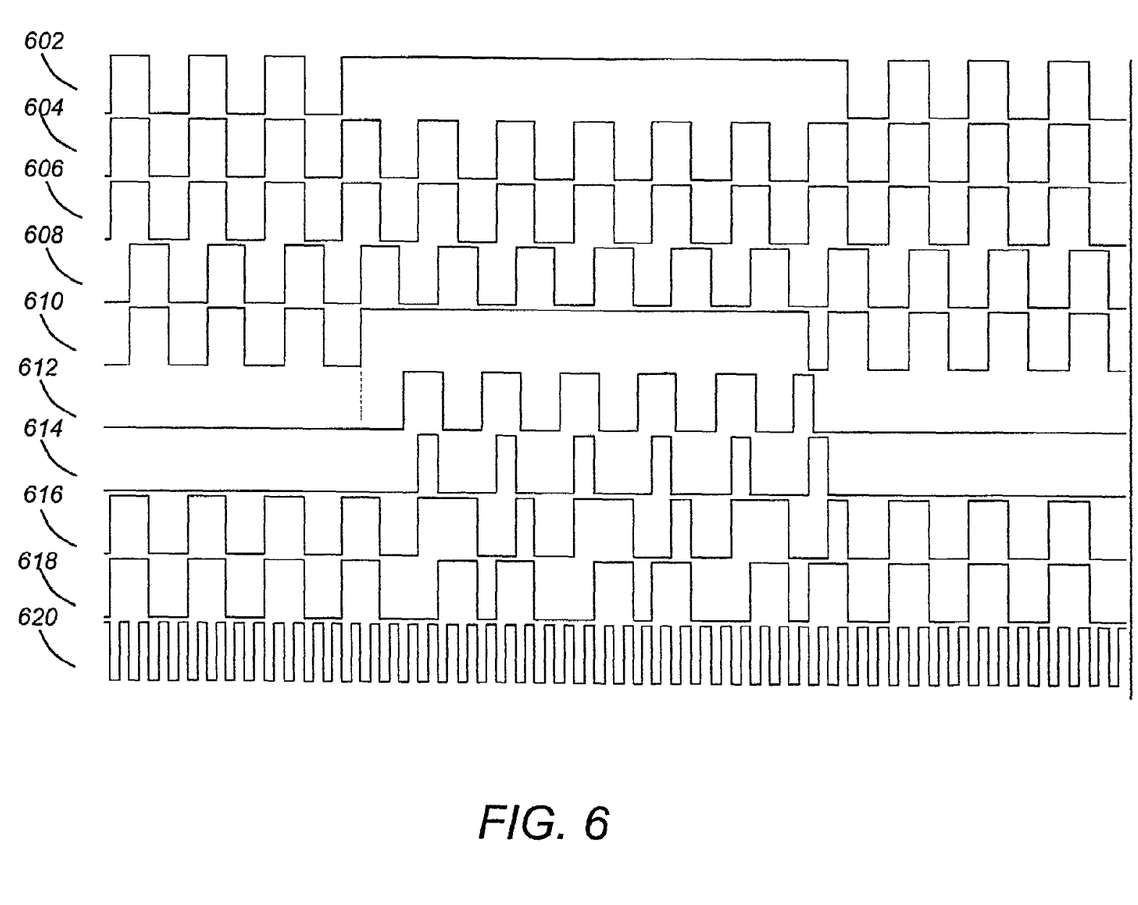
FIG. 6 is a timing diagram showing further operational characteristics of the present invention, showing the interaction between the feedback module and the divider.

FIG. 6 is timing diagram illustrating further operational characteristics of the present invention, showing the interaction between the feedback module 108 and divider 202A. All three dividers 202A–202C are working coherently (as shown in plots 602–606 until divider 202A suffers a SEU hit. The output of divider 202A (plot 602) propagates to the feedback module 108 xor00 signal shown in plot 610 of FIG. 4B, where it is XOR'ed with the voter output vout00 (plot 608) to produce the signal feedback module 108 XOR output (plot 614). The correction signal generated from the feedback module 108 (XOR_in_0) (plot 614) is then sent back to the logic correction module 104 coupled to the output of the corrupted divider 202A. This correction signal acts as the select switch input to the correction multiplexer 320 to flip the logic level of the incoming data as shown in plots 616 and 618.

Figure 7:
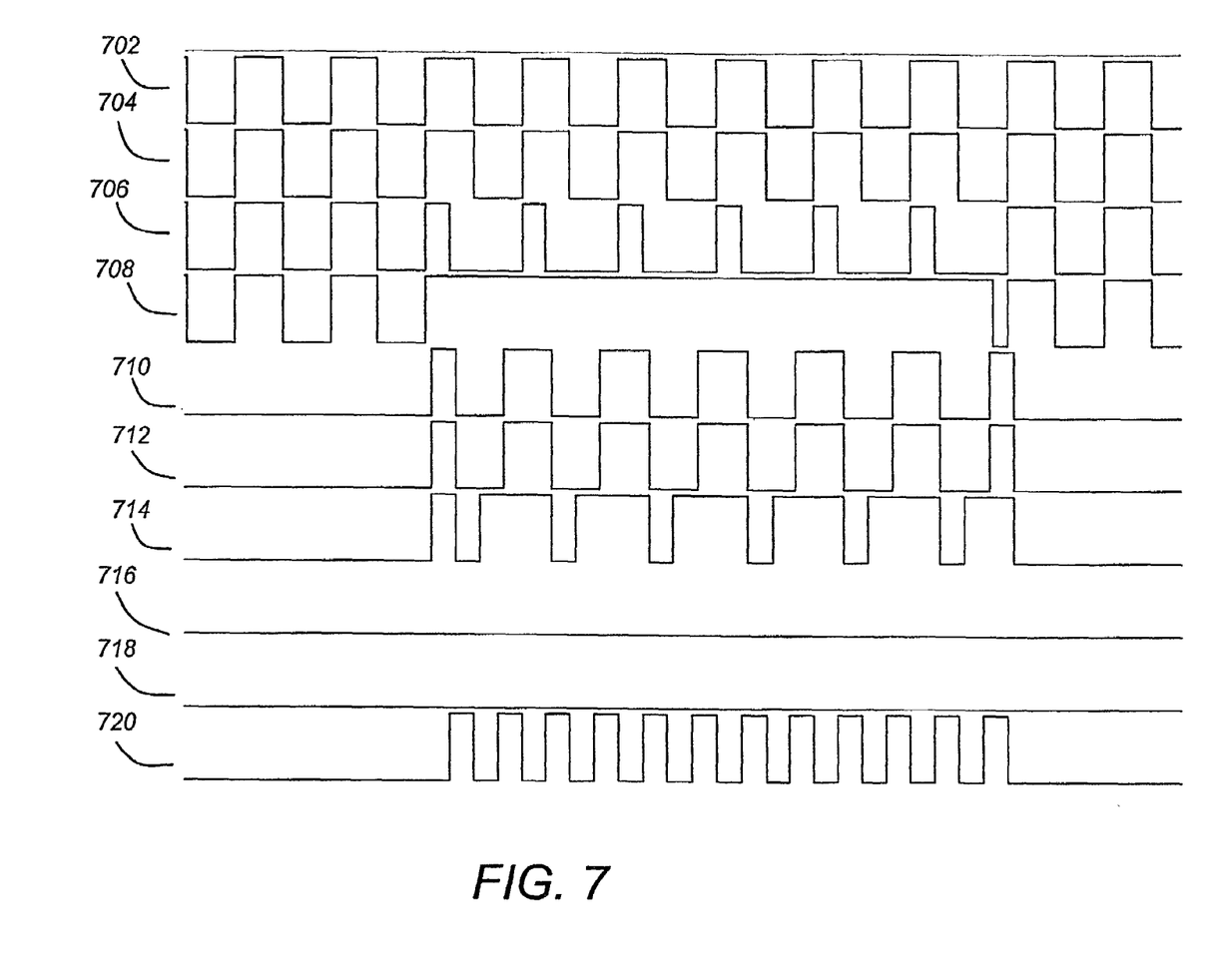
FIG. 7 is a timing diagram showing further details regarding the operation of one embodiment of the present invention.

FIG. 7 is a timing diagram showing the logic states of dividers 202A–202C (plots 702–706) in the event that the voter module 106 receives an SEU hit (as shown in plot 708). In this circumstance, all three outputs of XOR gates 406A–406C (indicated in FIG. 4B) are at a logic "one" state at some particular time, as shown in plots 710–714. The feedback module 108 then deactivates paths 0 and 1 (e.g. output from XOR gates 406B and 406C, as shown in plots 716 and 718) via the AND gate 414 and control multiplexers 414B and 414C that reset the output delay flip flops 412A–412C. Signal xor_in_2 (plot 720) from output delay flip flop 412A sends an incorrect correction pulse to divider 202C, causing the initial phase error in divider 202C with respect to divider 202B and divider 202A. Once the SEU charge dissipates from the voter module 106, divider_2 202C is re-aligned by the correction scheme detailed above.

Figure 8:
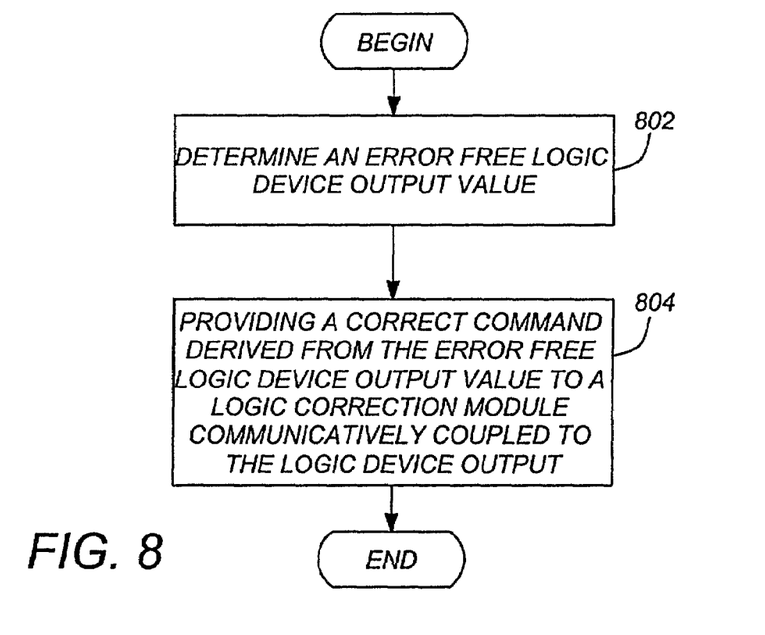
FIGS. 8–10 are flow charts showing illustrative process steps that can be used to practice one embodiment of the present invention.

FIG. 8 is a block diagram presenting illustrative process steps used to practice one embodiment of the present invention. In block 802, an error free logic device value is determined. A correct command is derived from the error free logic device output value and provided to a logic correction module 104 communicatively coupled to the logic device input, as shown in block 804. In performing these process steps, the logic correction module 104 may be integrated with the logic device presenting the erroneous output, or may be a separate module.

Figure 9:
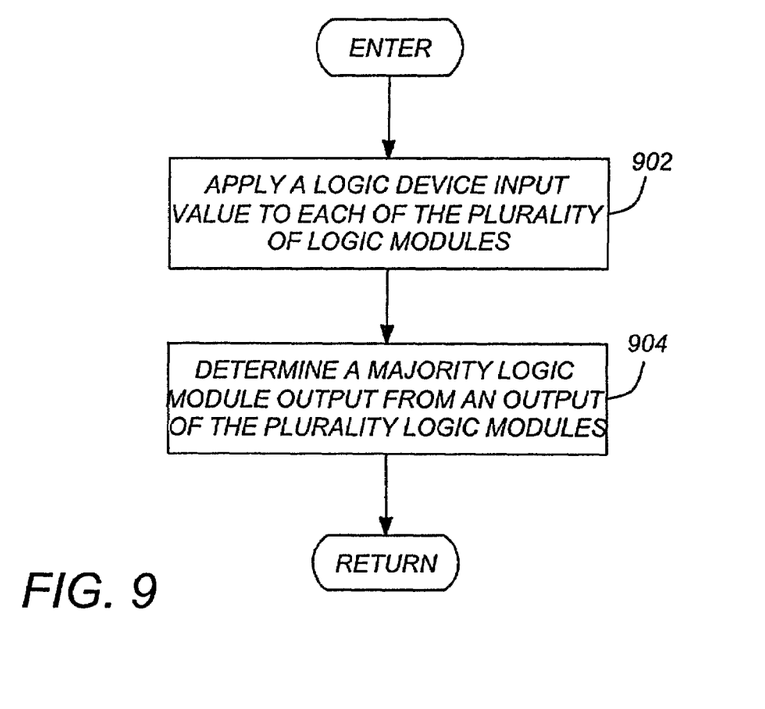

FIG. 9 is a block diagram presenting illustrative process steps used to determine an error free logic device output value. A logic device input is value is applied to each of a plurality of logic modules (for example, dividers 202A–202C), as shown in block 902. A majority logic module output is then determined from an output of the plurality of logic modules, as shown in block 904.

Figure 10:
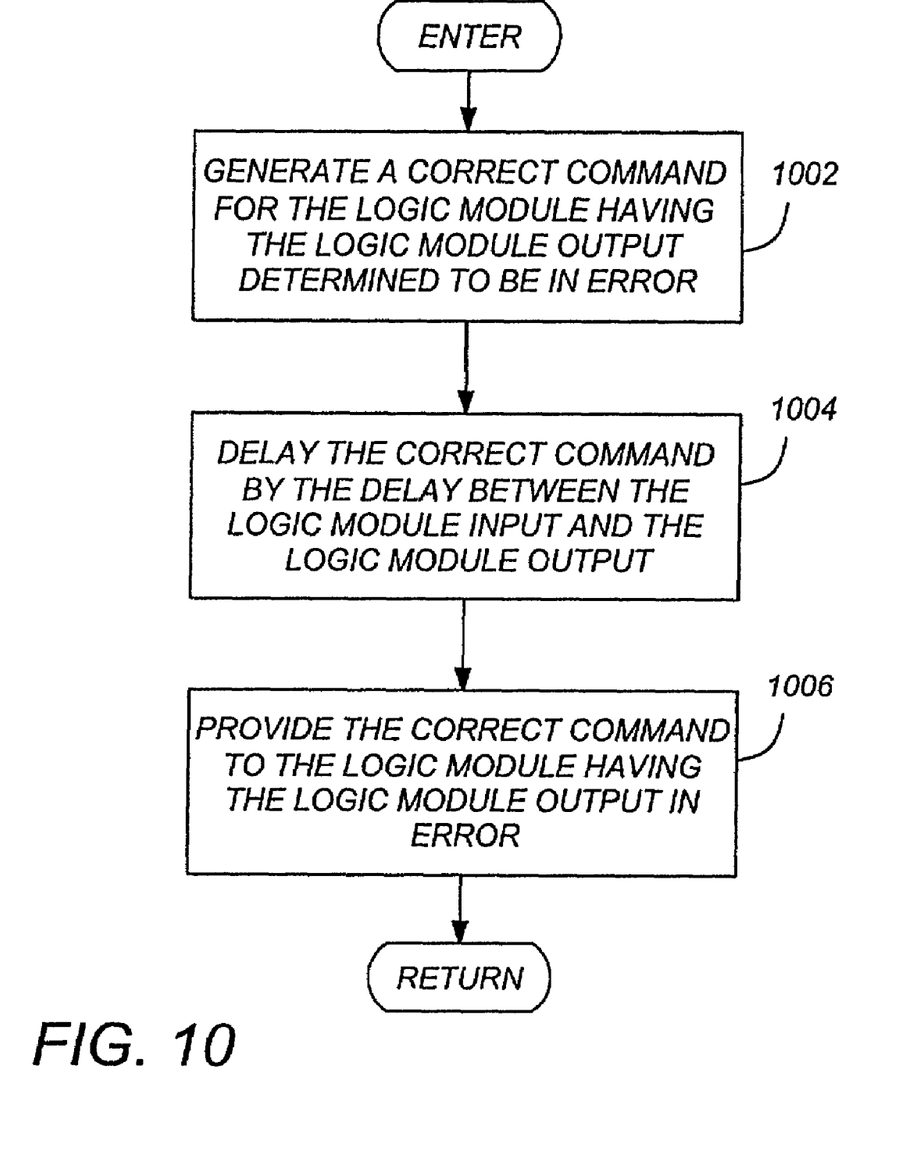

FIG. 10 is a block diagram presenting illustrative process steps used provide the correct command to the logic correction module 104. A correct command is generated for the logic module output that has been determined to be in error, as shown in block 1002. The correct command is then delayed by an amount substantially equal to the delay between the logic device input and the logic device output, as shown in block 1004. For example, the dividers 202A–202C, each delay an input signal by the equivalent of one or two clock cycles, depending on whether the divider is in the 2:1 mode or the 4:1 mode. In such case, the correction signal is delayed an amount equal to that which is required so that the correct signal is provided to the logic correction module 104 at the precise time that the output of the preceding delay flip flop 316.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An error correcting logic device, comprising:
   a plurality of logic modules communicatively coupled in parallel, each logic module including a logic module output;
   a voter module, communicatively coupled to the logic module outputs, the voter module configured to determine an error free logic device output;
   a feedback module, communicatively coupled to the voter module, the feedback module configured to determine which of the logic module outputs are in error and to provide a correct command; and
   a logic correction module, communicatively coupled to the feedback module and at least one of the logic modules, for correcting the logic module output of the at least one logic module;
   wherein the feedback module determines the error free logical device output from a majority value of the logic module outputs and compares the output of each of the logic modules with the majority value of the logic module outputs to determine which of the logic module outputs are in error.

2. The error correcting logic device of claim 1, wherein the logic correction module inverts the logic module output of the at least one logic module.

3. The error correcting logic device of claim 1, wherein the logic correction module comprises a multiplexer having an first input communicatively coupled to the at least one logic module output and an inverted second input communicatively coupled to the at least one logic module output.

4. The error correcting logic device of claim 1, wherein:
   at least one logic module comprises logic elements implementing a delay between a logic module input and the logic module output; and
   the feedback module comprises at least one delay element to delay the correct command by the delay.

5. The error correcting logic device of claim 1, wherein the feedback module provides a single correct command when more tan one of the logic module outputs are in error.

6. The error correcting logic device of claim 1, wherein the feedback provides fewer logic commands than logic module outputs that are in error.

7. The error correcting logic device of claim 1, wherein the feedback module provides a correct command output for each of the logic modules and the feedback module deactivates the correct command output of all but one of the logic modules when more than one of the logic module outputs are in error.

8. The error correcting logic device of claim 1, wherein the feedback module compares an output of each of the logic modules to determine an error free logical device output.

9. The error correcting logic device of claim 8, wherein the feedback module comprises an XOR gate communicatively coupled to the voter module, and each logic module output and wherein an output of each XOR gate indicates whether the logic module output is in error.

10. The error correcting logic device of claim 1, wherein the plurality of logic modules are dividers.

11. A method of correcting errors in a logic device having a plurality of logic modules coupled in parallel, the logic device further having a logic device input and an logic device output, comprising the steps of:
   determining an error free logic device output value, including the steps of applying a logic device input value to each of the plurality of logic modules and determining a majority logic module output of the plurality of logic modules; determining which of the logic module outputs are in error by performing steps including the steps of
      comparing each of the logic module outputs with the majority logic module output; and
      determining a logic module output as in error when the logic module output does not match the majority logic module output; and
   providing a correct command derived from the error free logic device output value to a logic correction module communicatively coupled to the logic device output.

12. The method of claim 11, wherein the logic device comprises elements implementing a delay between the logic device input and the logic device output, and the step of providing a correct command to the logic correction module comprises the steps of:
   generating a correct command for the logic module having the logic module output determined to be in error;
   delaying the correct command by the delay between the logic module input and the logic module output; and
   providing the correct command to the logic module having the logic module output in error.

13. The method of claim 11, wherein a single correction command is provided to a logic module even when more than one logic module outputs do not march the majority logic module output.

14. The method of claim 11, wherein the logic modules each include a logic correction module communicatively coupled to an uncorrected logic module output and the correct command is provided to the logic correct module when an erroneous uncorrected logic module output is provided to the logic correction module.

15. An apparatus for correcting errors in a logic device having a plurality of logic modules coupled in parallel, the logic device further having a logic device input and a logic device output, comprising:
   means for determining an error free logic device output value, including means for applying a logic device input value to each of the plurality of logic modules and means for determining a majority logic module output of the plurality of logic modules; means for determining which of the logic module outputs are in error; including
      means for comparing each of the logic module outputs with the majority logic module output; and
      means for determining a logic module output as in error when the logic module output does not march the majority logic module output; and
   means for providing a correct command derived from the error free logic device output value to a logic correction module communicatively coupled to the logic device output.

16. The apparatus of claim 15, wherein the logic device comprises elements implementing a delay between the logic device input and the logic device output, and the means for providing a correct command to the logic correction module comprises:
   means for generating a correct command for the logic module having the logic module output determined to be in error;
   means for delaying tire correct command by the delay between the logic module input and the logic module output; and
   means for providing the correct command to the logic module having the logic module output in error.

17. The apparatus of claim 16, wherein the logic modules each include a logic correction module communicatively coupled to an uncorrected logic module output and the correct command is provided to the logic correct module when an erroneous uncorrected logic module output is provided to the logic correction module.

18. The apparatus of claim 15, wherein a single correction command is provided to a logic module even when more than one logic module outputs do not match the majority logic module output.

* * * * *